(12) United States Patent
Zou

(10) Patent No.: US 11,660,554 B2
(45) Date of Patent: May 30, 2023

(54) APPLIANCE WATER FILTER CARTRIDGE

(71) Applicant: Qingdao Ecopure Filter Co., Ltd, Qingdao (CN)

(72) Inventor: Zhibin Zou, Qingdao (CN)

(73) Assignee: Qingdao Ecopure Filler Co., Ltd., Qingdao (CN)

( * ) Notice: Subject to any disclaimer, the term of this patent is extended or adjusted under 35 U.S.C. 154(b) by 693 days.

(21) Appl. No.: 16/680,011

(22) Filed: Nov. 11, 2019

(65) Prior Publication Data

US 2021/0138372 A1     May 13, 2021

(51) Int. Cl.
    *B01D 35/30*     (2006.01)
    *C02F 1/00*     (2023.01)
    *F25D 23/12*     (2006.01)

(52) U.S. Cl.
    CPC .............. *B01D 35/30* (2013.01); *C02F 1/003* (2013.01); *F25D 23/126* (2013.01); *B01D 2201/4023* (2013.01); *C02F 2201/006* (2013.01); *F25D 2323/121* (2013.01)

(58) Field of Classification Search
    CPC ...... B01D 2201/302; B01D 2201/4015; B01D 2201/4007; B01D 2201/006; B01D 35/30; B01D 2201/4023; B01D 2201/4046; B01D 35/153; C02F 1/003; C02F 1/006
    USPC ....... 222/189.06; 62/338; 210/232, 234, 236
    See application file for complete search history.

(56) References Cited

U.S. PATENT DOCUMENTS

| | | | | |
|---|---|---|---|---|
| 5,022,986 A * | 6/1991 | Lang | ...................... | B01D 35/30 210/453 |
| 5,700,371 A * | 12/1997 | Koslow | .................. | B01D 29/96 210/232 |
| 6,048,454 A * | 4/2000 | Jenkins | ................ | B01D 35/306 210/441 |
| 6,120,685 A * | 9/2000 | Carlson | ................ | B01D 35/306 210/DIG. 17 |
| 6,360,764 B1 * | 3/2002 | Fritze | ................... | B01D 35/157 137/15.01 |
| 6,579,455 B1 * | 6/2003 | Muzik | .................... | B01D 29/21 210/418 |
| 7,837,876 B2 * | 11/2010 | Ye | ........................... | C02F 9/005 210/418 |
| 9,044,699 B2 * | 6/2015 | Gale | ...................... | B01D 35/30 |
| 10,126,043 B2 * | 11/2018 | Mitchell | ................ | B01D 35/02 |
| D907,176 S * | 1/2021 | Qiang | .......................... | D23/209 |
| 2004/0094468 A1 * | 5/2004 | Fritze | ..................... | B01D 35/30 210/349 |

(Continued)

*Primary Examiner* — Charles P. Cheyney
(74) *Attorney, Agent, or Firm* — Calfee, Halter & Griswold LLP

(57) ABSTRACT

A water filter cartridge is provided. The water filter cartridge includes a filter housing enclosing a filtration material therein. A port shield is connected at one end of the filter housing and disposed between the filter housing and a connector part adapted for securing the water filter cartridge to a refrigerator filter part. The port shield is provided for at least partially covering a water inlet port and a water outlet port extending at least between the connector part through the port shield and at least partially through the filter housing. The port shield at least partially encloses the water inlet and/or water outlet port therebetween and also separates the filtration material and unfiltered water within the filter housing from the portions of the water inlet and outlet port within the port shield.

16 Claims, 5 Drawing Sheets

(56) References Cited

U.S. PATENT DOCUMENTS

| | | | |
|---|---|---|---|
| 2006/0091047 A1* | 5/2006 | Ye | B01D 21/0012 |
| | | | 210/234 |
| 2017/0259195 A1* | 9/2017 | Mitchell | B01D 35/30 |
| 2018/0001241 A1* | 1/2018 | Zhibin | B01D 35/153 |
| 2019/0217229 A1* | 7/2019 | Rookey | B01D 35/005 |

* cited by examiner

APPLIANCE WATER FILTER CARTRIDGE

TECHNICAL FIELD

The present disclosure relates generally to water filter assemblies and systems, and more particularly, to a replaceable water filter cartridge for use in an appliance water filtering system (e.g., a refrigerator appliance) to treat fluids and/or liquids (e.g., water) to be dispensed therefrom.

BACKGROUND

Water filtration systems, for example, refrigerator water filtration systems, have become popular as they assist to produce cleaner and better tasting water. Some of these refrigerator water filtration systems typically use water filters (e.g., a water filter cartridge) for filtering water dispensed therefrom. Traditional water filter cartridges are provided with a filtering media, for example, a block of activated carbon or other granular filtration media, within a casing of the water filter cartridge to enhance water filtration capability. These traditional water filter cartridges also include water ports for feeding and dispensing water at least partially disposed in the casing with the filtering media. The water filter's filtering media can adsorb or remove contaminants such as sand, rust, and cysts within the flow of water prior to delivering water or ice to a user (e.g., via the refrigerator's water dispenser or ice maker).

Unfortunately, during the filtering process the water filter cartridges may become blocked over time, for example, due to a saturation with the filtered contaminates. Additionally, the saturation of contaminates may further compromise the integrity and/or functionality of the water port (e.g., the water inlet port) delivering unfiltered water to the water filter cartridge due to the water inlet ports continuous exposure to the contaminated unfiltered water in the casing.

Accordingly, a need exists for an improved water filter cartridge to further enhance water filtration, and to better protect/guard the water ports from undesired contaminate exposure, which may lead to longer use time for the improved water filter cartridge.

SUMMARY

In an exemplary embodiment, a water filter cartridge for use with an appliance is provided. The water filter cartridge includes a filter housing. The filter housing includes a first end and a second end and defines a cavity therein. A filtration material may be disposed within the cavity and arranged therein for filtering source water delivered by at least a first water port. The water filter cartridge may further include a port shield connected to the first end of the filter housing. The water filter cartridge may also include a connector part connected to an end of the port shield opposite the first end of the filter housing where the port shield is secured thereto.

In yet a further exemplary embodiments, a refrigerator water filter cartridge is provided. The water filter cartridge may include a filter housing having a filtration media enclosed therein, and a port shield connected to a first end of the filter housing and adapted to at least partially enclose one or more water ports at least partially therebetween. The water filter cartridge further includes a connector part connected to an end of the port shield opposite the first end where the port shield connects to the filter housing. An inlet port configured for delivering water into the filter housing may be positioned in the connector part such that the inlet port extends from the connector part through the port shield and towards the first end of the filter housing.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

Figure 1A:
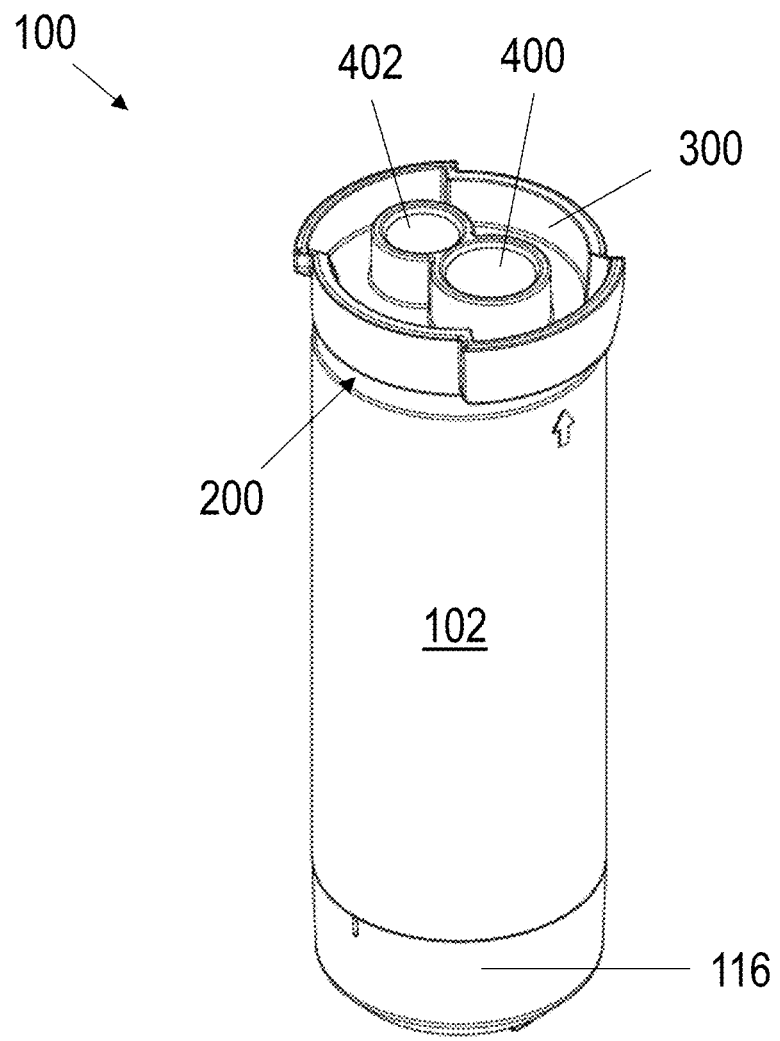
FIG. 1A illustrates an exemplary embodiment of a water filter cartridge in accordance with the disclosure provided herein.

Referring now to the drawings, which are for purposes of illustrating exemplary embodiments of the subject matter herein only and not for limiting the same, FIG. 1A shows an exemplary embodiment of a water filter cartridge 100 (also referred to as a water filter).

The water filter cartridge 100 may be a replaceable internal water filter cartridge 100 for use with a household and/or industrial appliance (e.g., a refrigerator appliance). As shown in FIG. 1A, the water filter cartridge 100 may include at least a filter housing 102, which may be hollow and may define a cavity 104 for enclosing a filtration material 106 therein. In some embodiments, the filter housing 102 may be substantially cylindrical and/or have a tubular-like shape. Additionally, or alternatively, the filter housing 102 may be sized to fully enclose the filtration material 106 therein.

The filtration material 106 (also referred to as filtering media) may be sized or otherwise shaped for being at least partially disposed within the cavity 104 for filtering source water (e.g., unfiltered water) flowing through the water filter cartridge 100. In some embodiments, the filtration material 106 may include activated carbon or be a carbon filter rod. Additionally, or alternatively, the filtration material 106 may include one or more of alumina balls, ion-exchange resin, or combinations thereof, or other water filtering media (e.g., granular filtration media) known to persons of ordinary skill in the art for filtering source water.

The cavity 104 may be sized or otherwise shaped to receive or otherwise enclose one or more additional parts of the water filter cartridge 100 therein. The additional parts may include, for example, parts for positioning and/or otherwise securing the filtration material 106 within the filter housing 102, or one or more fasteners (not shown) for selectively securing parts forming the water filter cartridge 100.

It should be appreciated that the cavity 104 may also be sized or otherwise shaped for containing source water and/or filtered water. The source water may be received from a water supply line (not shown) operably connected to the refrigerator appliance (not shown), for example, via a refrigerator filter part (not shown) when the water filter cartridge 100 is connected to the refrigerator filter part. Filtered water as used herein is defined as source water that has flowed through the filtration material 106.

Figure 2:
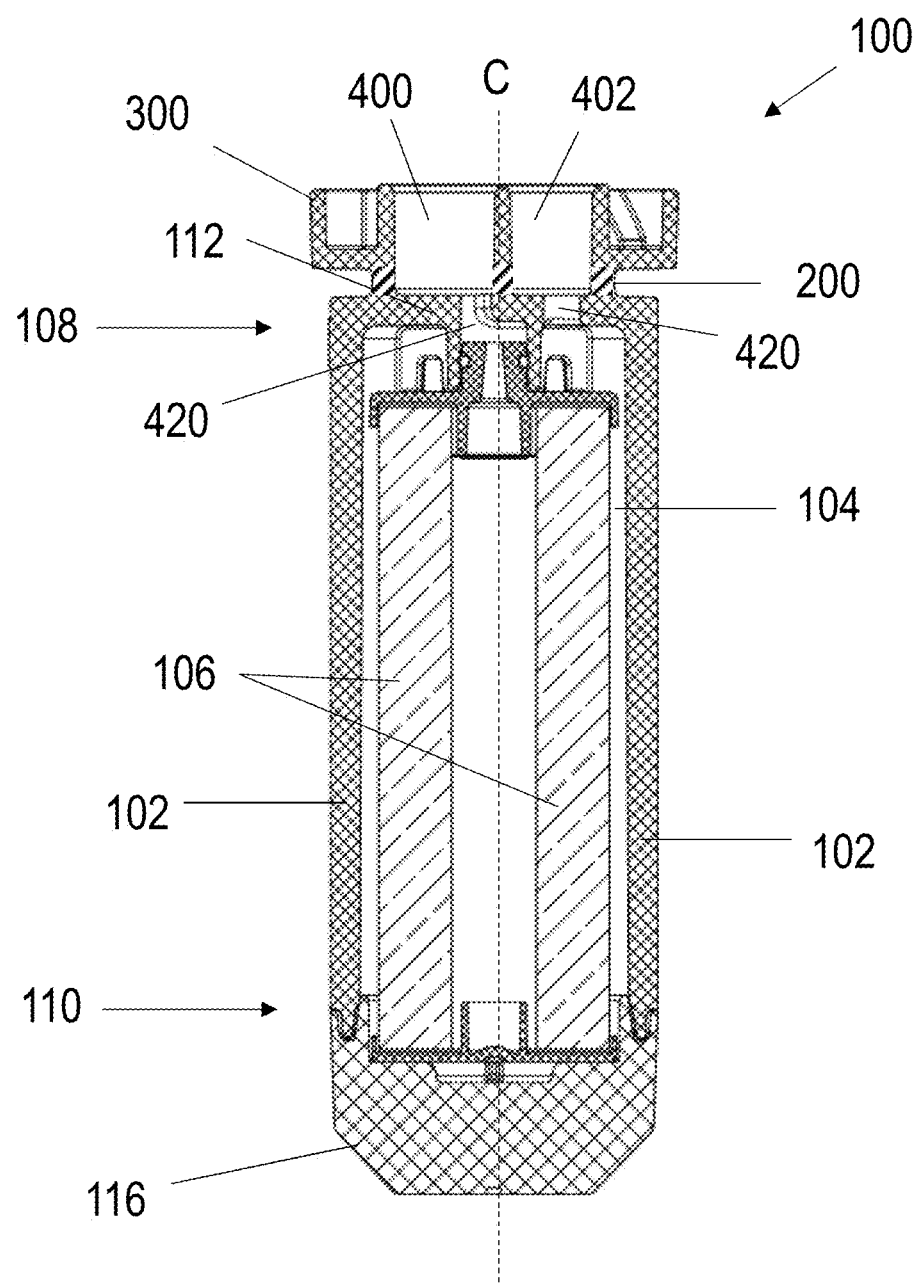
FIG. 2 illustrates a cross-sectional view of an exemplary embodiment of a water filter cartridge in accordance with the disclosure provided herein.

With continued reference to the figures, and now with reference to FIG. 2, the filter housing 102 includes a first end 108 and a second end 110 opposite the first end 108. In some embodiments, the first end 108 may include an end wall 112 having one or more openings extending at least partially therethrough and into the cavity 104. In some embodiments, one or more of the openings in the end wall 112 may be sized or otherwise shaped for receiving at least a portion of a water port (e.g., an inlet water port and/or an outlet water port) therebetween.

The filter housing 102 may further include a base 116 at the second end 110 of the filter housing 102. In some embodiments, the base 116 and the filter housing 102 may be formed from the same materials resulting in a single piece construction.

Additionally, or alternatively, the base 116 may be a separate part from the filter housing 102 and selectively secured at the second end 110 of the filter housing 102 via one or more fasteners 118 or similar securing means known to persons of ordinary skill in the art for securing a base to a filter housing.

In yet a further exemplary embodiment, the water filter cartridge 100 may include a port shield 200 (also referred to as port connector) operably connected to the filter housing 102 at the first end 108. In some embodiments, the port shield 200 may be formed of the same or similar materials to the filter housing 102, and may be secured at the first end 108 of the filter housing 102 via a securing means known in the art for securing one or more parts forming a water filter cartridge. Additionally, or alternatively, the port shield 200 may be formed from different materials forming the filter housing 102.

Figure 4A:
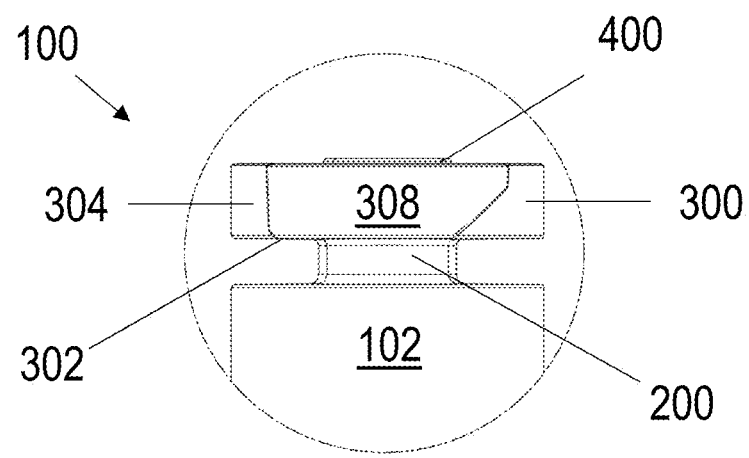
FIG. 4A illustrates a first side view of an exemplary embodiment of a water filter cartridge in accordance with the disclosure provided herein.
Figure 4B:
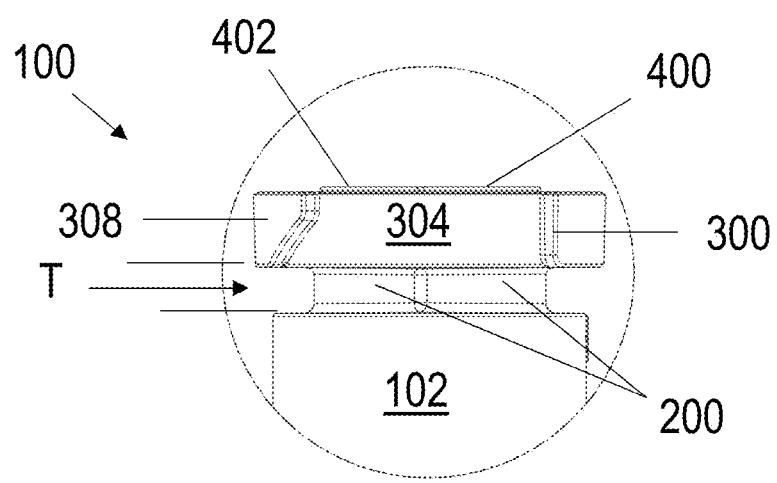
FIG. 4B illustrates a second side view of the exemplary water filter cartridge of FIG. 4A.

The port shield 200 may include one or more openings (not shown) extending through a thickness T (FIG. 4B) of the port shield 200 for at least partially receiving portions of a water port therebetween. It should be appreciated that one or more of the port shield 200 openings may be at least partially aligned with one or more openings in the end wall 112 of the filter housing 102 to allow for at least a portion of the water port to extend through both the port shield 200 opening and at least part of the end wall 112 opening for feeding source water into the cavity 104 and for delivering filtered water from the cavity 104.

The port shield 200 may partially or fully enclose the portions of the water port extending through the port shield 200 opening. In some embodiments, the port shield 200 may include a base at an end of the port shield 200 adjacent to the filter housing 102 (i.e., where the port shield 200 is secured at the first end 108 of the filter housing 102).

In some embodiments, the port shield 200 opening that is aligned with the opening in the end wall 112 may be formed in the port shield 200 base. It should be appreciated that the base may include multiple openings extending therethrough, and for example, into the cavity 104.

In some embodiments, one or more openings in the port shield 200 base may be smaller (e.g., have a smaller diameter) than an opening and/or similar recess that may extend at least partially through the thickness T of the port shield 200, for example, which may be where the water port is positioned or otherwise seated when shielded by the port shield 200.

Figure 1B:
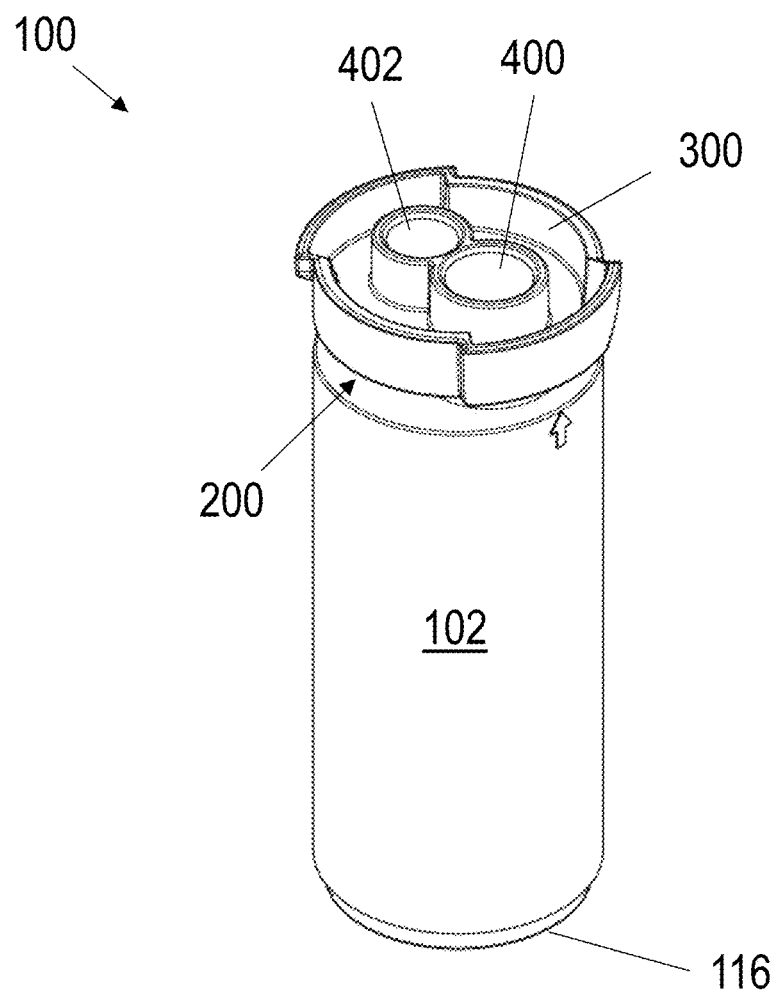
FIG. 1B illustrates a second exemplary embodiment of a water filter cartridge in accordance with the disclosure provided herein.

In some embodiments, a height of the base 116 may correspond with a height of the port shield 200. For example, a shorter base 116 (FIG. 1B) may be provided for embodiments where a taller port shield 200 may be desired for taller water ports and for fitment of the water filter cartridge 100 in the appliance.

In some embodiments, the height of the base 116 and/or the port shield 200 may be adjustable. Adjusting the height of the base 116 and/or port shield 200 may be achieved via a mechanical device configured to adjust the height via rotating the base 116 and/or other parts of the water filter cartridge 100 in a first or second opposite direction, or via other height adjustment means known to persons of ordinary skill in the art.

Figure 3:
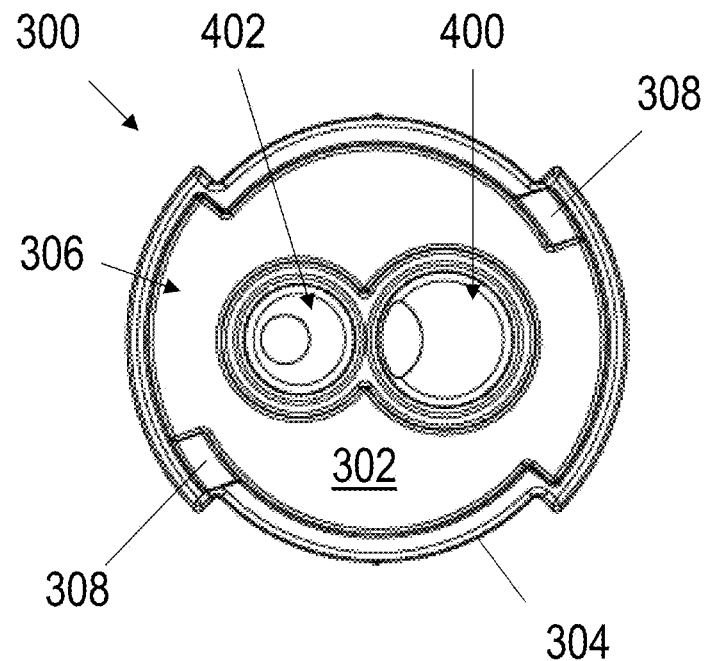
FIG. 3 illustrates a perspective view of an exemplary embodiment of a connector part of a water filter cartridge in accordance with the disclosure provided herein.

With continued reference to the figures, and now with reference to FIG. 3, the water filter cartridge 100 may include a connector part 300 selectively secured to the port shield 200 at an opposite end from where the port shield 200 connects to the filter housing 102. The connector part 300 may be adapted or otherwise shaped for attaching the water filter cartridge 100 to a refrigerator filter part (not shown).

In some embodiments, the connector part 300 may be formed from the same or similar materials to the filter housing 102 and/or the port shield 200. Additionally, or alternatively, different materials may be chosen for forming the connector part 300.

In the exemplary embodiment of FIG. 3, the connector part 300 may include a base 302. The base 302 may be connectable to the port shield 200. In some embodiments, the connector part 300 may include a connector wall 304 formed along a perimeter of the base 302 and extending from the base 302 in a direction opposite (i.e., away) from the port shield 200 (e.g., away from where the base 302 interfaces with the port shield 200). The connector wall 304 and base 302 may define an area 306 within the connector part 300 where one or more water ports may be disposed or otherwise selectively secured. In some embodiments, the thickness T of the port shield 200 may be equal to or less than a height of the connector wall 304.

With continued reference to FIG. 3, at least a first water port 400 and second water port 402 may be disposed within the area 306 of the connector part 300. The first water port 400 and/or the second water port 402 may be selectively secured to the base 302, or in some embodiments, within a recessed area (or similar opening) in the base 302 adapted or otherwise sized for securing one or more water ports therebetween.

It should be appreciated that the first water port 400 and the second water port 402 may both extend at least partially through the base 302 openings for being seated and/or secured within an associated opening in the port shield 200.

Additionally, or alternatively, the first water port 400 and/or second water port 402 may include a conduit 420 or similar channel for feeding source water into the cavity 104 and, in some embodiments, for delivering filtered water from the water filter cartridge 100. In some embodiments, for example, as illustrated in FIG. 2, the conduit 420 may be the portion of the water port that extends through an opening in the port shield 200 base (e.g., a smaller opening) that may be aligned with a similarly sized opening in the end wall 112 of the filter housing 102.

It should be appreciated that the conduit 420 may extend continuously through the end wall 112 until an opening of the conduit 420 is positioned such that water may be fed into at least an area of the cavity 104 that may be designated or otherwise adapted for receiving source water.

In some embodiments, each water port may include its own port shield 200, or in other embodiments, a single port shield 200 may be provided for securing both the first water port 400 and the second water port 402.

With continued reference to the figures, the first water port 400 and/or the second water port 402 may be positioned relative to a center point of the connector part 300, and in some embodiments, for example, a centerline C (FIG. 2) of the water filter cartridge 100 when assembled.

At least one of the water ports may be a water inlet port for receiving source water into the water filter cartridge 100, while the other may be a water outlet port for delivering filter water from the water filter cartridge 100. Additionally, or alternatively, each water port may be a female water port (i.e., a female water inlet port and a female water outlet port), which may be fitted with or to a corresponding male refrigerator filter port for mating or otherwise connecting the water filter cartridge 100.

It should be appreciated, that each water port may be a male water port adapted to mate or otherwise connect to a corresponding female refrigerator filter port, or in some embodiments, the water ports may be one male and one female depending on the desired configuration for connecting to the refrigerator.

It should be appreciated that in the exemplary embodiment of FIG. 2, the filtration material 106 and source water fed into the cavity via the water inlet port may be solely enclosed within the filter housing 102 such that no filtration material 106 and/or source water may be disposed or contained within the port shield 200.

In yet a further exemplary embodiment, the connector part 300 may include one or more ramps 308 formed on the connector wall 304 to assist with connecting and disconnecting the water filter cartridge 100. For connecting and disconnecting the connector part 300, the water filter cartridge 100 may interface or otherwise engage a corresponding connector part in the appliance, and at least a part of the water filter cartridge 100 may be rotated (e.g., twisted) in a left or right direction causing the ramps 308 to rotatably connect the water filter cartridge 100 (e.g., at the connector part 300) to the appliance for filtering water.

In some embodiments, a pair of opposed ramps 308 may be provided. The pair of opposed ramps 308 may be disposed on opposite sides of the connector wall 304. Additionally, or alternatively, the opposed ramps 308 may be symmetrically disposed on opposites sides of the connector wall 304 (or the area 306).

In some embodiments, one or more of the water ports may include one or more seals disposed or otherwise secured thereon for sealingly engaging the water ports to the corresponding connection piece in the appliance (e.g., the refrigerator filter part) and to reduce or otherwise prevent water leakage when installed and/or in use.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

I claim:

1. A water filter comprising:
   a filter housing having a first end and a second end and defining a cavity therein;
   a filtration material disposed within the cavity and arranged therein for filtering water;
   at least one port shield having a first end and a second opposite end, wherein the first end of the at least one port shield is connected to the first end of the filter housing;
   a connector part connected to the second end of the port shield opposite the filter housing, the connector part comprising a base and a connector wall formed along a perimeter of the base and extending from the base in a direction opposite the port shield;
   a pair of water ports at least partially extending between the connector part through the at least one port shield and toward the filter housing such that the at least a portion of at least one of the pair of water ports extends into the cavity for feeding source water therein for filtering via the filtration material in operation; and
   wherein a perimeter of the at least one port shield is less than the perimeter of the base of the connector part and the first end of the filter housing.

2. The water filter of claim 1, wherein the filtration media is enclosed solely within the filter housing.

3. The water filter of claim 1, wherein the connector part includes a pair of opposed ramps connectable to a refrigerator filter part.

4. The water filter of claim 3, wherein the opposed ramps are disposed on opposite sides of the connector part.

5. The water filter of claim 1, wherein the filtration material is a carbon filter rod.

6. The water filter of claim 1, wherein only a portion of the pair of water ports extend into the filter housing.

7. The water filter of claim 1, each of the pair of water ports includes a mating portion, and wherein the mating portion of each water port is disposed entirely between the connector part and the at least one port shield and not the filter housing.

8. A water filter cartridge comprising:
   a filter housing having a filtration media enclosed therein;
   at least one port shield having a first end and a second end opposite the first end, wherein the first end is connected to the filter housing;
   a connector part connected to the second end of the at least one port shield, the connector part comprising a base and a connector wall formed along a perimeter of the base and extending from the base in a direction opposite the port shield;
   an inlet port configured for delivering water into the filter housing and positioned in the connector part such that the inlet port at least partially extends from the connector part through the at least one port shield and towards the filter housing;
   an outlet port configured for dispensing filtered water from the filter housing, wherein the outlet port is adjacent to the inlet port in the connector part and at least partially extends from the connector part through the at least one port shield and towards the filter housing;

wherein the at least one port shield is adapted to at least partially enclose the inlet port, the outlet port, or the inlet port and the outlet port; and wherein a perimeter of the at least one port shield is less than the perimeter of the base of the connector part and the first end of the filter housing.

9. The water filter cartridge of claim 8, wherein the connector part includes a pair of opposed ramps disposed on opposite sides of the connector wall.

10. The water filter cartridge of claim 9, wherein the pair of opposed ramps are symmetrically disposed on opposite sides of the connector wall.

11. The water filter cartridge of claim 8, wherein the filtration media is enclosed solely within the filter housing.

12. The water filter cartridge of claim 8, wherein portions of the inlet port and outlet port for connecting the inlet and outlet ports to a refrigerator filter part are disposed solely between an opening of the connector part and the least one port shield and not the filter housing.

13. The water filter of claim 1 further comprising:
a second port shield disposed between the filter housing and connector part and adjacent a first port shield, wherein the second port shield is connected at a first end to the filter housing and at a second opposite end to the connector part.

14. The water filter of claim 13, wherein each water port at least partially extends from the connector part through its own port shield and towards the filter housing.

15. The water filter cartridge of claim 8 further comprising:
a second port shield disposed between the filter housing and connector part and adjacent a first port shield, wherein the second port shield is connected at a first end to the filter housing and at a second opposite end to the connector part.

16. The water filter cartridge of claim 15, wherein the inlet port at least partially extends from the connector part through the first port shield and towards the filter housing, and wherein the outlet port at least partially extends from the connector part through the second port shield and towards the filter housing.

* * * * *